Dec. 13, 1966 G. O. GRAVES 3,291,032
CEREAL PUFFING MACHINE
Filed Aug. 22, 1962 2 Sheets-Sheet 1

INVENTOR.
GEORGE O. GRAVES
BY Hobbs & Caston
ATTORNEYS

INVENTOR.
GEORGE O. GRAVES
BY *Hobbs & Easton*
ATTORNEYS

United States Patent Office 3,291,032
Patented Dec. 13, 1966

3,291,032
CEREAL PUFFING MACHINE
George O. Graves, 802 S. Carlisle, South Bend, Ind.
Filed Aug. 22, 1962, Ser. No. 218,613
2 Claims. (Cl. 99—238)

The present invention relates to a cereal puffing machine and more particularly to a machine for producing puffed cereal products such as puffed corn and rice sticks or collets.

In processing corn and rice meal to produce collets, the meal is first mixed with water in an amount less than that required to form a paste, and the resultant mixture is pressurized and extruded at a temperature sufficiently high to vaporize the moisture in the meal mix and to gelatinize the starch in the meal. The material, as it emerges from the extrusion die from which it is severed into sections of the desired length, is normally cylindrical in shape, highly cellular and relatively brittle. The material thus produced is further processed by baking, salting and coating with a cheese mix, for example, and is then packaged ready for shipping. The final product to be satisfactory must be uniform in texture and flavor and the sections or pieces should be substantially the same size. Normally, considerable care and skill must be exercised in the operation of the machine used in the production of untreated collets or sticks if a satisfactory product is to be obtained. The production of collets on a large scale has been perfected so that little difficulty is normally encountered in obtaining a satisfactory product, provided rigid production standards and meal quality are maintained. Machines for producing collects at a relatively high production rate are covered by my U.S. Patents Nos. 2,842,072 and 2,853,027. These machines include a disc-shaped head plate having a relatively large number of holes therethrough arranged in a circle and communicating with a cylindrical chamber in which a screw rotates to pressurize the meal and force it through the holes at a temperature and pressure sufficiently high to prebake the product. These machines are normally used in food processing plants and are part of an overall operation for producing in high volume a packaged material to be sold in grocery stores, restaurants and at snack bars.

While commercial machines of the aforementioned type are satisfactory for large scale plant production, they are unsuitable for small operations designed primarily to manufacture the product and sell it promptly to the public in unsealed bags, ready to be eaten. One of the principal objects of the present invention, therefore, is to provide a machine of relatively small capacity which can be operated continuously for extended periods of time to produce cereal collets and similar products for immediate final treatment and sale.

The type of unit involved here is designed for use in restaurants, 5 and 10 cents stores, department stores and super markets and the like, and by the very nature of the product, the machine cannot be effectively operated intermittently without disassembling, cleaning and reassembling the machine each time the machine is stopped for any substantial period of time. For satisfactory operation the operating temperature of the head of the machine and the pressure of the product entering and passing through the head must be maintained at substantially constant values. It is therefore another object of the present invention to provide a machine of low capacity which can be effectively controlled and operated to process meal under substantially constant temperatures and pressures and which will produce a product of uniform texture and size.

A further object of the invention is to provide a machine of low capacity for producing prebaked cereal products of the aforesaid type in which the cereal in the form of meal is pressurized, heated and then forced through a head having two stages in which the material is worked or kneaded before being extruded from the machine in finger or pellet-like forms.

A further object of the invention is to provide a cereal processing machine of the aforesaid type which is relatively simple in construction, operation and maintenance, and which can be readily installed and safely operated in public places, such as stores, supermarkets and restaurants, without any special outlets or utility lines and without highly skilled personnel.

Additional objects and advantages of the invention will become apparent from the following description and accompanying drawings, wherein.

Figure 1:
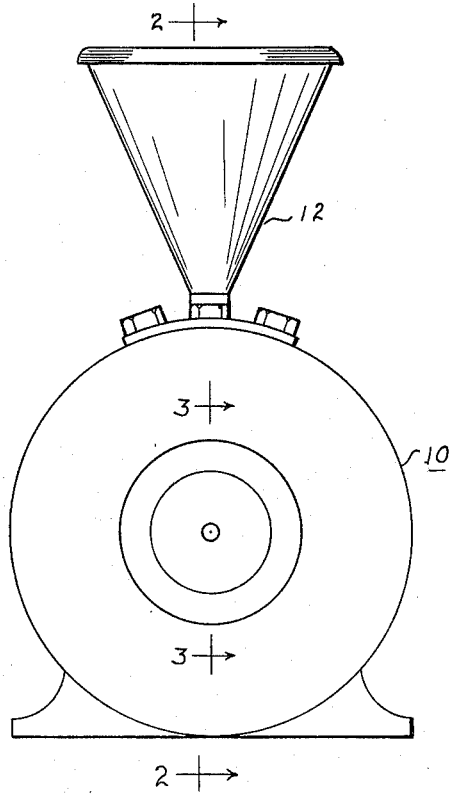
FIGURE 1 is a front elevational view of a food processing machine embodying the present invention.
Figure 2:
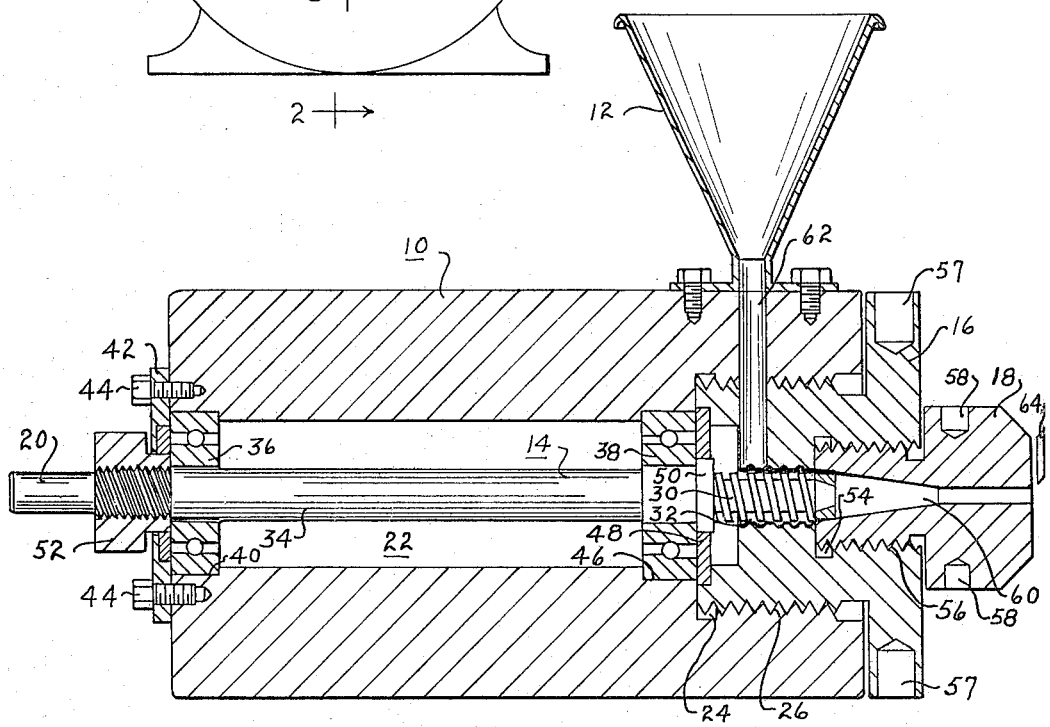
FIGURE 2 is a vertical cross sectional view of the machine shown in FIGURE 1, the section being taken on line 2—2 of the latter figure.

Referring more specifically to the drawings, FIGURES 1 and 2 illustrate a simplified form of the machine embodying the present invention, consisting basically of a body 10, hopper 12, screw and drive assembly 14, stator 16 and head die 18. The screw and drive assembly 14 is driven by a suitable motor attached to the end 20 of the assembly.

Machine body 10 consists of a steel casting having a cylindrical bore 22 extending longitudinally therethrough and a chamber 24 for receiving stator 16, the stator being secured in chamber 24 by threads 26 on the internal surface of chamber 24 and on the external surface of stator 16. The screw assembly consists of a screw 30 in a cylindrical bore 32 of stator 16 and a shaft 34 extending lengthwise through bore 22 and being journalled in ball bearings 36 and 38 at opposite ends of bore 22. Bearing 36 is seated in an annular recess 40 on the left-hand end of body 10, as viewed in FIGURE 2, and is retained therein by a retaining ring 42 secured to the end of the body by a plurality of bolts 44 extending through the ring and threadedly received in holes in the end of the body. Ball bearing 38 is seated in an annular recess 46 on the right-hand end of cylindrical bore 22, and is retained therein by a retainer ring 48 seated against the ball bearing and held in place by stator 16. Screw 30 and shaft 34 are preferably formed as one piece and a collar 50 integral with the shaft is interposed between the screw and the shaft portion and is adapted to seat firmly against the right-hand side of bearing 38, thus preventing end-wise movement of the screw to the left during the operation of the screw. A collar or tab 52 is threaded onto the left-hand end of shaft 34 and is adapted to seat firmly against bearing 36 to prevent end-wise movement in the right-hand direction. The head die 18 is secured to stator 16 in a recess 54 by threads 56 in the surface of recess 54 and on the external surface of the head die. When the head die is mounted in the stator and fully seated in recess 54, the inner end thereof terminates at the forward end of screw 30. The head die contains an elongated passage 60 having a tappered inlet and a generally elongated cylindrical portion. The stator 16 may be removed and replaced conveniently by using tool sockets 57, and the head die can be removed and replaced in recess 54 using tool sockets 58 in the periphery thereof.

The cereal meal is placed in hopper 12 and is supplied to chamber 32 through vertical pasage 62 extending from the lower portion of the hopper to the upper portion of chamber 32 near the inner end thereof. As the screw is rotated, meal is fed by gravity from hopper 12 through passage 62 to chamber 32 where the screw forces the meal toward head die 18. As the meal is forced toward the die, the restriction created by the head die increases the pressure of the screw on the meal, heating the meal sufficiently to vaporize the moisture and gelatinize the starch in the meal. The fluid material thus formed is forced through the passages in the head die with increasing temperatures and is extruded through the outlet opening, and upon contact with the atmosphere the material expands and solidifies, forming rather brittle, elongated finger-like products. A knife, represented by numeral 64, passes the outlet opening intermittently to sever the finger-like product from the die. The speed of the knife can be varied to produce finger or pellet-like products of the desired length, depending upon the speed of the knife.

While the pressure and temperature used in the production of the product are critical within a relatively narrow range, a more satisfactory product can be obtained by the use of a multiple stage arrangement in which the material being processed at the elevated pressure and temperature is agitated or kneaded in the head die. The various head dies shown in FIGURES 3 through 8 are designed to produce an effective kneading action, while the cereal material is under the required temperature and pressure.

Figure 3:
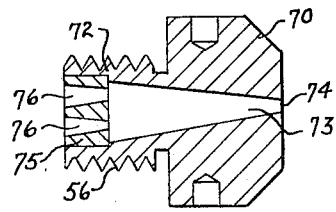
FIGURE 3 is a vertical cross sectional view through one form of head die, the section being taken on line 3—3 of FIGURE 1.

The head die, as shown in FIGURE 3, consists of body and stem portions 70 and 72, the stem portion containing threads 56 for securing the head die in recess 54. A longitudinal passage 73 is conical in shape extending a substantial length of the head die and terminating in a relatively small discharge opening 74 on the face of the die. The inlet consists of an insert 75 having a plurality of passages 76, preferably either three or four, tapered inwardly and communicating with passage 73. The inlet of each passage 76 is relatively large and communicates with the peripheral portion of chamber 32 so that the meal being forced along the convolutions of the screw will readily enter passages 76. The cereal material on leaving passages 76 tends to swirl and to develop eddy currents which have a kneading effect on the material throughout a substantial portion of passage 73. As the material leaves passage 73 at port 74 and with the relieving of the pressure on the material, it expands and cools, producing a highly cellular and relatively brittle product.

Figure 4:
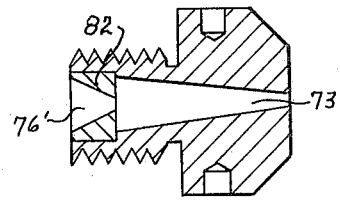
FIGURE 4 is a vertical cross sectional view similar to that shown in FIGURE 3, representing a modified form of the present invention, having a single hole inlet and outlet.
Figure 5:
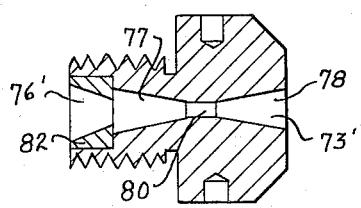
FIGURE 5 is a vertical cross sectional view of a further modified form of head die, the section being the same as that shown in FIGURE 3.
Figure 6:
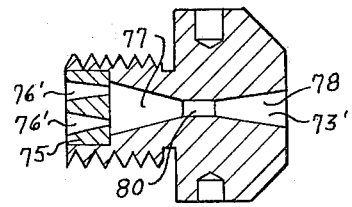
FIGURE 6 is a vertical cross sectional view through a further modified form of a head die having a multiple inlet and a single outlet hole construction.

It will be seen that there are three basic combinations of passage configurations illustrated in FIGURES 3 through 8. In FIGURES 3 and 4, the principal passage 73 is conically-shaped, whereas in FIGURES 5 and 6, passage 73′ consists of two conical sections 77 and 78 connected at their smaller ends by a small cylindrical section 80. The inlets of passages 76′ in FIGURE 4 and 5 are of single hole construction formed in an insert member 82, whereas in FIGURE 6 the inlet portion consists of a plurality of holes 76′ in insert member 75, the same in construction and design as the insert in FIGURE 3.

Figure 7:
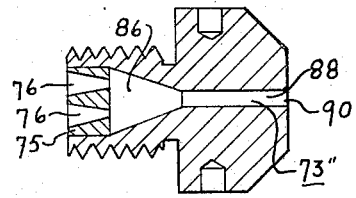
FIGURE 7 is a vertical cross sectional view through a further modified form of head die illustrating another multiple inlet and single outlet hole construction.
Figure 8:
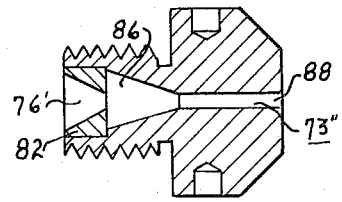
FIGURE 8 is a vertical cross sectional view through a head die similar to that shown in FIGURE 1, having single inlet and outlet hole construction.

In the embodiment of the invention shown in FIGURES 7 and 8, inserts 75 and 82 similar to those shown in FIGURES 3 and 4, respectively, are used as the inlet members; however, the outlet passage 73″ consists of a conical portion 86 and a straight cylindrical portion 88 connected to the small end of the conical portion and having a discharge opening 90 on the face of the head die.

In each of the head dies illustrated, a two-stage operation is involved, the first stage being created by the relatively small tapered inlet portions in insert members 75 and 82, and the second stage being created by passage 73′ or 73″ with kneading or agitation of the material occurring as at emerges from the holes in inserts 75 and 82, and during the early stages in passages 73, 73′ and 73″. This two-stage action with the kneading operation produces a uniform, properly gelatinized material free of unprocessed meal which might cause bad spots, rendering the product unsatisfactory for commercial use.

In the operation of the present machine, the meal is placed in hopper 12 which, for the purpose of illustrating the present invention, consists of a simple funnel-shaped receptacle, and the screw is rotated as the meal feeds from the hopper downwardly through passage 62. The screw forces the meal along the convolutions thereof and discharges it into the holes in insert members 75 or 82 where the pressure and temperature of the meal increase sufficiently to prebake the meal. As the meal passes into and along the passages 73, 73′ and 73″, it is kneaded and agitated to give the proper consistency before it is discharged from the outlet port. As the meal emerges from these passages, it expands and solidifies and is cut into the desired lengths by knife 64. Since in the embodiment of the present invention illustrated in the drawings, only one passage is used, the machine can be run continuously at relatively low production for long periods of time.

After the machine has been stopped and permitted to at least partially cool, it is necessary to remove head die 18 from stator 16, and stator 16 from body 10 in order to clean the solidified prebaked meal from passage 60 and from the convolutions of the screw. On restarting the machine, application of heat to the stator and head die is required initially; however, thereafter the pressure created by the screw on the meal and the friction of the meal on the screw and side walls of chamber 32 and in the passages in the head die, maintain the required temperature for vaporizing the moisture and gelatinizing the starch in the meal.

While only one type of machine with several variations in the head die has been illustrated in the drawings, various changes and further modifications may be made without departing from the scope of the invention.

I claim:

1. A machine for producing puffed product from corn and rice meal and the like, comprising a body having a chamber having a horizontal bore therethrough and a cylindrical recess with threaded side walls in one end of said body in axial alignment with said bore, a stator having a cylindrical portion with a threaded surface for seating in said recess and threadedly engaging the threads in the walls thereof and having axial chambers therein in the internal and external sides thereof, a screw in said internal chamber, a shaft connected to said screw and extending through said bore, bearings at each end of said bore for said shaft, and a head die secured to said stator in said external chamber and having a passage therethrough in axial alignment with said screw, said passage having a two-stage construction including a first portion tapered inwardly from inlet to outlet and communicating with said internal chamber, a second portion tapered inwardly from inlet to outlet and connected to the small end of said first portion and being larger at its large end than the small end of said first portion, a hopper above said body for corn and rice meal, and a passage connecting said hopper to said internal chamber.

2. A machine for producing puffed product from cereal, comprising a body having a bore therethrough and a cylindrical recess with threaded side walls in one end of said body in axial alignment with said bore, a stator having a cylindrical portion with a threaded surface for seating in said recess and threadedly engaging the threads in the walls thereof and having axial chambers therein on the internal and external sides thereof, a screw in said internal chamber, a shaft connected to said screw and extending through said bore, bearings at each end of said bore for said shaft, a head die secured to said stator in said external chamber and having a passage therethrough in axial alignment with said screw, said passage having a two-stage construction, including a first portion tapered inwardly from inlet to outlet and communicating with said internal chamber, and a second portion tapered inwardly from inlet to outlet and connected to the small end of said first portion and being larger at its large end than the small end of said first portion.

References Cited by the Examiner

UNITED STATES PATENTS

| | | |
|---|---|---|
| 822,101 | 5/1906 | Copleston. |
| 2,245,608 | 6/1941 | Rogers. |
| 2,705,927 | 4/1955 | Graves. |
| 2,802,430 | 8/1957 | Filler _____ 107—14 |
| 2,853,027 | 9/1958 | Graves _____ 99—238 X |
| 2,915,957 | 12/1959 | Bowman _____ 107—14.5 |
| 3,008,434 | 11/1961 | Maldari _____ 107—14.7 |
| 3,018,715 | 1/1962 | McLeary et al. _____ 99—238 |

FOREIGN PATENTS 331,496  9/1958  Switzerland.

WALTER A. SCHEEL, *Primary Examiner.*

J. SCHNALL, *Examiner.*

E. HOROWITZ, C. I. COUGHENOUR,
*Assistant Examiners.*